United States Patent
Yamada et al.

(10) Patent No.: US 7,175,765 B2
(45) Date of Patent: Feb. 13, 2007

(54) METHOD FOR TREATING FOR-TREATMENT WATER CONTAINING ORGANIC MATTER AND NITROGEN COMPOUND

(75) Inventors: Atsushi Yamada, Gunma (JP); Mineo Ikematsu, Ibaraki (JP); Masahiro Iseki, Saitama (JP); Daizo Takaoka, Gunma (JP); Yui Ogawa, Gunma (JP); Yoshihiro Kurokawa, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 138 days.

(21) Appl. No.: 10/823,788

(22) Filed: Apr. 14, 2004

(65) Prior Publication Data

US 2004/0256317 A1    Dec. 23, 2004

(30) Foreign Application Priority Data

Apr. 16, 2003  (JP)  ............................. 2003-111304
Mar. 12, 2004  (JP)  ............................. 2004-070281

(51) Int. Cl.
*C02F 3/00* (2006.01)

(52) U.S. Cl. ...................... 210/615; 210/620; 210/748; 210/758; 210/760

(58) Field of Classification Search ................ 210/601, 210/748, 605, 615–617, 760, 758, 620
See application file for complete search history.

(56) References Cited

U.S. PATENT DOCUMENTS

| | | | | |
|---|---|---|---|---|
| 3,864,473 A | * | 2/1975 | Ciaudelli | ...................... 424/60 |
| 5,916,444 A | * | 6/1999 | Leech | ........................ 210/602 |
| 6,083,377 A | * | 7/2000 | Lin et al. | ..................... 205/617 |
| 6,372,472 B1 | * | 4/2002 | Nehls et al. | ................. 435/198 |
| 6,984,326 B2 | * | 1/2006 | Iseki et al. | ................... 210/631 |
| 2003/0141202 A1 | * | 7/2003 | Nakamura et al. | .......... 205/701 |
| 2003/0217919 A1 | * | 11/2003 | Yajima et al. | ............... 204/412 |

FOREIGN PATENT DOCUMENTS

| | | | | |
|---|---|---|---|---|
| GB | 2184431 A | * | 6/1987 | |
| JP | 54-16844 | | 2/1979 | |

\* cited by examiner

*Primary Examiner*—Chester T. Barry
(74) *Attorney, Agent, or Firm*—McDermott Will & Emery LLP (57) ABSTRACT

There is provided a method for treating for-treatment waste water containing an organic matter and a nitrogen compound, which can quickly and efficiently treat the for-treatment water containing the organic matter and the nitrogen compound and greatly reduce a power consumption amount, and which can be achieved by a relatively compact apparatus. A gist is that in treatment of the for-treatment water containing the organic matter and the nitrogen compound, the followings are carried out: an electrochemical treatment step of immersing at least a pair of electrodes at least partially in the for-treatment water to treat the nitrogen compound thereof by an electrochemical technique; and a biochemical treatment step of biochemically treating the nitrogen compound in the for-treatment water after completion of the electrochemical treatment step.

16 Claims, 5 Drawing Sheets

METHOD FOR TREATING FOR-TREATMENT WATER CONTAINING ORGANIC MATTER AND NITROGEN COMPOUND

BACKGROUND OF THE INVENTION

The present invention relates to a method for treating a nitrogen compound of organic nitrogen, nitrite nitrogen, nitrate nitrogen, ammonia nitrogen or the like in organic waste water discharged from, e.g., a livestock breeder or the like.

It has conventionally been well known that presence of a nitrogen compound is one of causes of eutrophication of rivers and lakes. A great volume of such nitrogen compounds is present in domestic life waste water, industrial waste water or livestock breeder's waste water. At present, however, it is difficult to purify the nitrogen compounds, and no effective countermeasures are available. Especially, organic waste water (referred to as for-treatment water, hereinafter) discharged from a livestock breeder such as a hog raiser contains many organic matters of high ammonia nitrogen and organic nitrogen chemical oxygen demand (COD) or biochemical oxygen demand (BOD), and purification has been very difficult.

Aerobic biochemical treatment is generally carried out. However, since the treatment comprises two processes, i.e., a nitrification process for converting ammonia nitrogen into nitrite nitrogen, and the nitrite nitrogen into nitrate nitrogen, and a denitrification process for converting nitrate nitrogen into nitrogen gas, two reaction vessels are required, and treatment time is long, creating a problem of low treatment efficiency. Especially, since reaction efficiency of the nitrification process which oxidizes ammonia to be nitrate nitrogen is low, there has been a problem that a large reaction vessel is required.

In order to solve the above technical problems, electrolysis has conventionally been carried out to treat ammonia nitrogen, nitrite nitrogen or nitrate nitrogen in for-treatment water to nitrogen gas by using a noble metal such as platinum, iridium, or palladium for an anode, and feeding a current to the for-treatment water (e.g., Japanese Patent Application Laid-Open No. 54-16844).

However, if organic waste water discharged from the livestock breeder or the like is treated by conventional electrolysis, there is a problem of enormous power costs. Especially, much power is required for reaction to reduce nitrate nitrogen to nitrite nitrogen, and reaction to reduce nitrite nitrogen to ammonia nitrogen. Much power is also required for electrolysis of the organic matter contained in the organic waste water. Consequently, the reduction of the organic waste water containing much nitrate nitrogen to nitrogen gas only by electrolysis has a problem of a great cost burden.

SUMMARY OF THE INVENTION

The present invention has been made to solve the foregoing conventional technical problems, and provides a method for treating for-treatment waste water containing an organic matter and a nitrogen compound, which can quickly and efficiently treat the for-treatment water containing the organic matter and the nitrogen compound and greatly reduce a power consumption amount, and which can be achieved by a relatively compact apparatus.

That is, according to the present invention, a method for treating for-treatment water containing an organic matter and a nitrogen compound comprises, in treatment of the for-treatment water containing the organic matter and the nitrogen compound, a first treatment step of immersing a pair of electrodes at least partially in the for-treatment water to treat the same by an electrochemical technique, and a second treatment step of biochemically treating the for-treatment water after completion of the first treatment step.

According to the present invention, a method for treating for-treatment water containing an organic matter and a nitrogen compound comprises, in treatment of the for-treatment water containing the organic matter and the nitrogen compound, a first treatment step of adding electrolytic water in which hypohalogenous acid, ozone or active oxygen is generated, or hypohalogenous acid of a drug to the for-treatment water by an electrochemical technique, and a second treatment step of biochemically treating the for-treatment water after completion of the first treatment step.

According to the present invention, a method for treating for-treatment water containing an organic matter and a nitrogen compound comprises, in treatment of the for-treatment water containing the organic matter and the nitrogen compound, a first treatment step of adding electrolytic water in which hypohalogenous acid, ozone or active oxygen is generated, or a hypohalogenous acid of a drug to the for-treatment water by an electrochemical technique, and immersing a pair of electrodes at least partially in the for-treatment water to treat the same by an electrochemical technique, and a second treatment step of biochemically treating the for-treatment water after completion of the first treatment step.

According to the method of the invention for treating the for-treatment water containing the organic matter and the nitrogen compound, the second treatment step uses a microbe to reduce nitrate nitrogen or nitrite nitrogen in the for-treatment water to nitrogen gas at least under anaerobic conditions.

According to the method of the invention for treating the for-treatment water containing the organic matter and the nitrogen compound, the second treatment step uses granular sludge.

According to the method of the invention for treating the for-treatment water containing the organic matter and the nitrogen compound, the second treatment step uses a microbe carried by a carrier.

According to the method of the invention for treating the for-treatment water containing the organic matter and the nitrogen compound, BOD concentration of the organic matter in the for-treatment water treated in the second treatment step is set larger by 2.8 or more than concentration of the nitrate nitrogen therein.

According to the method of the invention for treating the for-treatment water containing organic matter and the nitrogen compound, after completion of the second treatment step, a COD.BOD treatment step is carried out to reduce COD and BOD of a residual organic matter in the for-treatment water.

According to the method of the invention for treating the for-treatment water containing the organic matter and the nitrogen compound, each electrode used in the first treatment step is an insoluble conductive material capable of generating hypohalogenous acid, ozone or active oxygen.

According to the method of the invention for treating the for-treatment water containing the organic water and the nitrogen compound, a noble metal or a conductive material coated with a noble metal is used as one of the electrodes which constitutes at least an anode.

According to the method of the invention for treating the for-treatment water containing the organic matter and the nitrogen compound, the conductive material coated with the noble metal is coated by plating of the noble metal.

According to the method of the invention for treating the for-treatment water containing the organic matter and the nitrogen compound, a VIII group of a periodic table or a conductive material containing a VIII group, alternatively a conductive material coated with the same group or a conductive material containing the same group is used as one of the electrodes which constitutes a cathode.

According to the method of the invention for treating the for-treatment water containing the organic matter and the nitrogen compound, in the first treatment step, a polarity of each of the electrodes is switched to treat the nitrogen compound in the for-treatment water by an electrochemical technique.

According to the method of the invention for treating the for-treatment water containing the organic matter and the nitrogen compound, before execution of the second treatment step after execution of the first treatment step, an available chlorine removal treatment step is carried out to remove an available chlorine component from the for-treatment water.

According to the method of the invention for treating the for-treatment water containing the organic matter and the nitrogen compound, a third treatment step is carried out to filter the for-treatment water at a stage before the first treatment stage, or between the first treatment step and the second treatment step.

According to the method of the invention for treating the organic matter and the nitrogen compound, the for-treatment water is organic waste water.

According to the present invention, the method for treating the for-treatment water containing the organic matter and the nitrogen compound comprises the first treatment step of immersing the pair of electrodes at least partially in the for-treatment water to treat the same by the electrochemical technique, and the second treatment step of biochemically treating the for-treatment water after completion of the first treatment step. Thus, the nitrogen compound contained in the for-treatment water is first reduced in the first treatment step, and then the nitrogen compound contained therein can be treated in the second treatment step.

Especially, ammonia nitrogen contained in the for-treatment water can be efficiently denitrified in the first treatment step. Then, in the second treatment step, nitrate nitrogen generated in the for-treatment water in the first treatment step can be reduced to nitrogen gas.

Accordingly, an efficient reaction can be carried out from ammonia nitrogen to nitrogen in the first treatment step. An efficient reduction reaction can be carried out from nitrate nitrogen to nitrogen gas in the second treatment step.

Therefore, by carrying out the reduction reaction from the nitrate nitrogen to the nitrogen gas whose enormous power consumption has conventionally been a problem in the second treatment step after the first treatment step, it is possible to reduce the amount of power consumption and running costs.

Moreover, in the biochemical treatment, oxidation reaction of low efficiency from organic nitrogen and ammonia nitrogen to nitrate nitrogen is carried out in the first treatment step before the second treatment step, whereby it is not necessary to dispose an especially large reaction vessel. Thus, the invention can be achieved by a relatively compact apparatus.

According to the present invention, the method for treating the for-treatment water containing the organic matter and the nitrogen compound comprises the first treatment step of adding electrolytic water in which hypohalogenous acid, ozone or active oxygen is generated, or hypohalogenous acid of a drug to the for-treatment water by the electrochemical technique, and the second treatment step of biochemically treating the for-treatment water after completion of the first treatment step. Thus, the nitrogen compound contained in the for-treatment water is first reduced in the first treatment step, and then the nitrogen compound contained therein can be treated in the second treatment step.

Especially, ammonia nitrogen contained in the for-treatment water can be efficiently denitrified in the first treatment step. Then, in the second treatment step, nitrate nitrogen generated in the for-treatment water in the first treatment step can be reduced to nitrogen gas.

Accordingly, an efficient reaction can be carried out from ammonia nitrogen to nitrogen in the first treatment step. An efficient reduction reaction can be carried out from nitrate nitrogen to nitrogen gas in the second treatment step.

Therefore, by carrying out the reduction reaction from the nitrate nitrogen to the nitrogen gas whose enormous power consumption has conventionally been a problem in the second treatment step after the first treatment step, it is possible to reduce the amount of power consumption and running costs.

Moreover, in the biochemical treatment, oxidation reaction of low efficiency from organic nitrogen and ammonia nitrogen to nitrate nitrogen is carried out in the first treatment step before the second treatment step, whereby it is not necessary to dispose an especially large reaction vessel. Thus, the invention can be achieved by a relatively compact apparatus.

According to the present invention, the method for treating the for-treatment water containing the organic matter and the nitrogen compound comprises the first treatment step of adding electrolytic water in which hypohalogenous acid, ozone or active oxygen is generated, or a hypohalogenous acid of a drug to the for-treatment water by the electrochemical technique, and immersing the pair of electrodes at least partially in the for-treatment water to treat the same by the electrochemical technique, and the second treatment step of biochemically treating the for-treatment water after completion of the first treatment step. Thus, the nitrogen compound contained in the for-treatment water is first reduced in the first treatment step, and then the nitrogen compound contained therein can be treated in the second treatment step.

Especially, ammonia nitrogen contained in the for-treatment water can be efficiently denitrified in the first treatment step. Then, in the second treatment step, nitrate nitrogen generated in the for-treatment water in the first treatment step can be reduced to nitrogen gas.

Accordingly, an efficient reaction can be carried out from ammonia nitrogen to nitrogen in the first treatment step. An efficient reduction reaction can be carried out from nitrate nitrogen to nitrogen gas in the second treatment step.

Therefore, by carrying out the reduction reaction from the nitrate nitrogen to the nitrogen gas whose enormous power consumption has conventionally been a problem in the second treatment step after the first treatment step, it is possible to reduce the amount of power consumption and running costs.

Moreover, in the biochemical treatment, oxidation reaction of low efficiency from organic nitrogen and ammonia nitrogen to nitrate nitrogen is carried out in the first treatment step before the second treatment step, whereby it is not necessary to dispose an especially large reaction vessel. Thus, the invention can be achieved by a relatively compact apparatus.

Especially, if the second treatment step uses a microbe to reduce nitrate nitrogen or nitrite nitrogen in the for-treatment water to nitrogen gas at least under anaerobic conditions, the microbe can cause an oxidation decomposition reaction of the organic matter by using oxygen in nitrous acid or nitric acid under conditions of no dissolved oxygen. Accordingly, it is possible to efficiently reduce nitrate nitrogen or nitrite nitrogen in the for-treatment water. Further, even the organic matter in the for-treatment water can be decomposed to enable more effective treatment of the for-treatment water.

Moreover, by using the granular sludge in the second treatment step, it is possible to more effectively treat the nitrate nitrogen or the nitrite nitrogen, and the organic matter in the for-treatment water. Additionally, by using the microbe carried by the carrier in the second treatment step, microbe concentration in the vessel for executing the second treatment step can be increased to enable more efficient treatment of the for-treatment water.

According to the invention, the BOD concentration of the organic matter in the for-treatment water treated in the second treatment step is set larger by 2.8 or more than concentration of the nitrate nitrogen therein. Thus, an amount of an organic matter necessary for treating the nitrate nitrogen in the for-treatment water can be secured to enable more effective treatment of the nitrate nitrogen therein. Additionally, by preventing presence of an organic matter more than necessary, it is possible to prevent a problem of a great amount of a residual organic matter after treatment.

According to the invention, after completion of the second treatment step, the COD.BOD treatment step is carried out to reduce COD and BOD of the residual organic matter in the for-treatment water. Thus, if an amount of an organic matter in the for-treatment water is larger than that of the nitrate nitrogen therein at a point of time of starting the second treatment step, the residual organic matter after completion of the second treatment step can be treated in the COD.BOD treatment step to enable more effective execution of waste water treatment.

According to the invention, in each of the foregoing inventions, each electrode used in the first treatment step is an insoluble conductive material capable of generating hypohalogenous acid, ozone or active oxygen. Thus, hypohalogenous acid, ozone or active oxygen can be generated by the electrode which constitutes the anode. By such hypohalogenous acid or the like, ammonia in the for-treatment water can be subjected to an efficient denitrification reaction. It is possible to more efficiently treat the for-treatment water. Additionally, since each electrode is an insoluble conductive material, a problem of electrode elution can be prevented by electrolysis, and maintenance workability such as electrode replacement can be simplified.

According to the invention, in each of the foregoing embodiments, the noble metal or the conductive material coated with the noble metal is used as one of the electrodes which constitutes at least the anode. Thus, hypohalogenous acid, ozone or active oxygen can be more efficiently generated in the for-treatment water to increase treatment efficiency of the ammonia therein. Especially, by using the noble metal coated conductive material plated with the noble metal as the metal coated with the noble metal, the for-treatment water can be treated more efficiently than a conductive material coated with a sintered noble metal, and durability can be enhanced.

According to the invention, the VIII group of the periodic table or the conductive material containing the VIII group, alternatively the conductive material coated with the same group or the conductive material containing the same group is used as one of the electrodes which constitutes the cathode. Thus, the nitrate nitrogen in the for-treatment water can be reduced to ammonia to be denitrified and, at the same time, the polarity is switched to dissolve the anode, whereby phosphorus contained in the for-treatment water can be precipitated and removed.

According to the invention, in each of the foregoing inventions, in the first treatment step, the polarity of each electrode is switched to treat the nitrogen compound in the for-treatment water by the electrochemical technique. Thus, formation of an oxidized film such as a scale on the surface of the electrode which constitutes the anode can be prevented by the electrochemical technique (electrolysis) to avoid passivation of the anode.

According to the invention, in each of the foregoing inventions, before execution of the second treatment step after execution of the first treatment step, the available chlorine removal treatment step is carried out to remove the available chlorine component from the for-treatment water. Thus, even if oxidizing agent such as hypochlorous acid is generated especially in the first treatment step, it is possible to prevent a problem that oxidizing agent such as hypochlorous agent is mixed in the second step to adversely affect the microbe which causes the denitrification reaction.

According to the invention, in each of the foregoing inventions, the third treatment step is carried out to filter the for-treatment water at the stage before the first treatment stage, or between the first treatment step and the second treatment step. Thus, a solid portion can be removed from the for-treatment water in a pre-treatment step to increase reaction efficiency of the first and second treatment steps thereafter.

Furthermore, according to the invention, in each of the foregoing inventions, the for-treatment water is organic waste water. Thus, it is possible to efficiently treat waste water discharged from a hog farm or the like.

DETAILED DESCRIPTION OF THE PREFERRED EMBODIMENT

Figure 1:
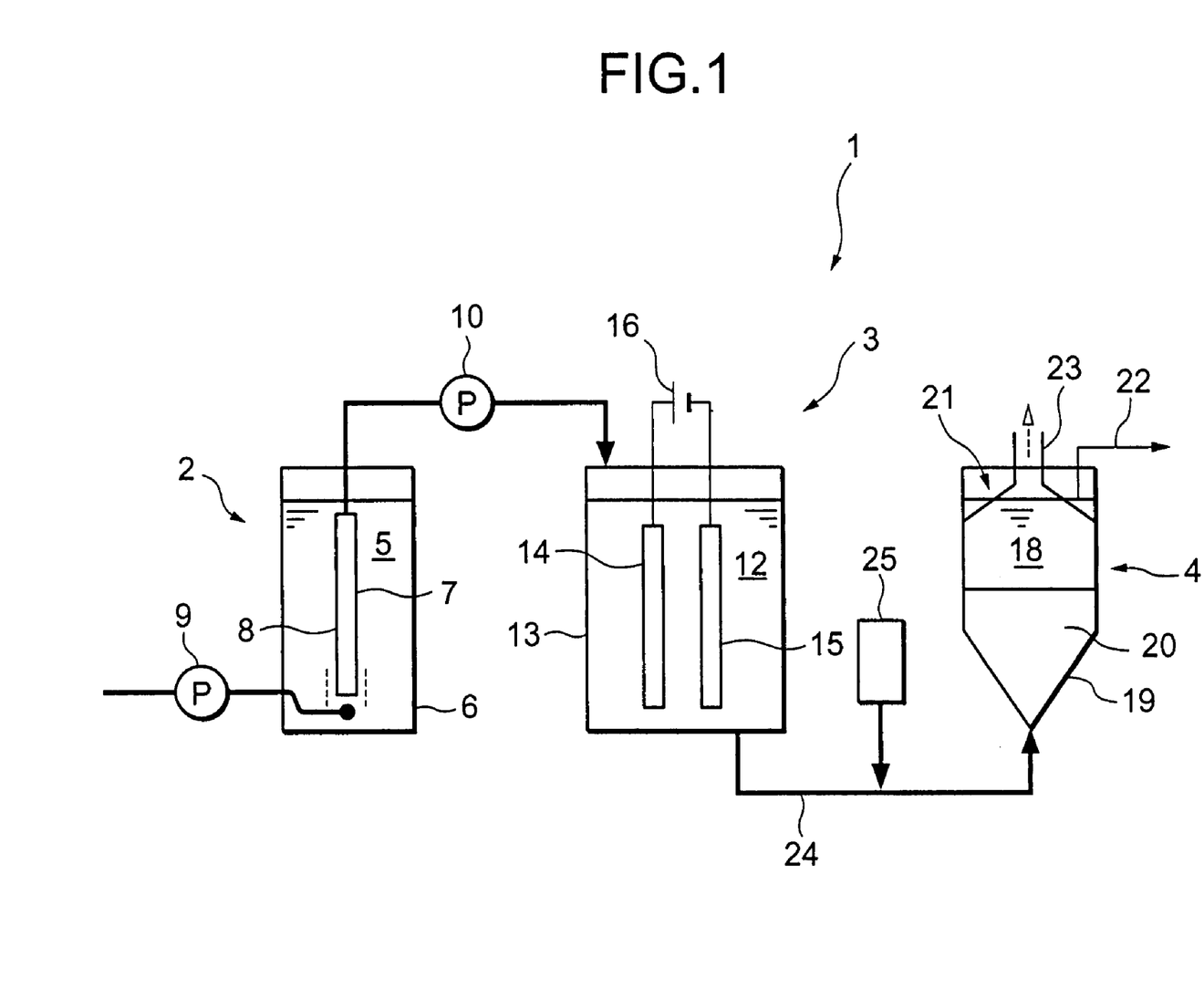
FIG. 1 is an explanatory view showing the outline of a processing system for the treatment of organic waste water in accordance with one example of the present claimed subject matter.

Next, the preferred embodiment of the present invention will be described with reference to the accompanying drawings. A treatment system 1 of the embodiment treats organic waste water (for-treatment water) which contains an organic matter and a nitrogen compound, such as hog farm's waste liquid fed as raw water, and comprises a pre-treating apparatus 2 for filtering the organic waste water, an electrolytic treating apparatus 3, and a biochemical treating apparatus 4.

The pre-treating apparatus 2 of the embodiment comprises a pre-treating vessel 6 which constitutes a pre-treating chamber 5 having an inlet and an output (not shown) of waste water therein, filtering means 8 equipped with a flat film 7 in waste water of the pre-treating chamber 5, a pump 9 for feeding waste water into the pre-treating vessel 6, and a pump 10 for conveying the waste water filtered through the flat film 7 to the electrolytic treating apparatus 3.

The electrolytic treating apparatus 3 comprises an electrolytic vessel 13 which constitutes an electrolytic chamber 12 having an inlet and an outlet (not shown) of waste water therein, a pair of electrodes 14, 15 arranged to confront each other so that at least parts thereof can be immersed in the waste water of the electrolytic chamber 12, a power source 16 for energizing the electrodes 14, 15, and a controller (not shown) for controlling the power source 16. Incidentally, agitation means may be disposed in the electrolytic vessel 13 for agitation therein.

Each of the electrodes 14, 15 is made of a noble metal such as platinum (Pt) or a mixture of platinum and iridium (Ir), or an insoluble conductive material coated therewith. According to the embodiment, a platinum electrode is used. Additionally, according to the embodiment, each of the electrodes 14, 15 is made of the noble electrode, or the conductive material coated therewith. However, if no polarity switching is executed between the electrodes 14 and 15, at least only the electrode 14 which constitutes an anode may be made of the noble metal or the conductive material coated therewith, while the electrode 15 which constitutes a cathode may be made of another conductive material.

In the foregoing, the noble metal or the conductive material coated therewith may be prepared by plating of the noble metal. In such a case, organic waste water can be treated more efficiently than that in the case of a conductive material coated with a sintered noble metal, and durability can be enhanced.

The biochemical treating apparatus 4 comprises a denitrification reaction vessel 19 which constitutes a denitrification reaction chamber 18 having an inlet in a lower part or a bottom surface. An anaerobic state of no dissolved oxygen is set in the denitrification reaction chamber 18. A lower part of the denitrification reaction chamber 18 is filled with granular sludge 20, and gas-solid liquid separation means 21 is disposed in an upper part. Further, a liquid is taken out through a pipe 22 to the outside by the gas-solid liquid separation means, and gas is discharged through a pipe 23 to the outside.

The granular sludge 20 is prepared by self-granulating a subordinate bacteria (microbe) such as "Pseudomonas Denitrificans" or "Pseudomonas Aerufinose" which reduces nitrate nitrogen or nitrite nitrogen in the organic waste water into particles of about 0.5 to 2 mm at least under anaerobic conditions.

According to the embodiment, the denitrification reaction chamber 8 is filled with the granular sludge 20. Instead, however, the denitrification reaction chamber 8 may be filled with a microbe carried on a carrier to execute denitrification. In such a case, concentration of the microbe in the denitrification reaction chamber 18 can be increased to enable more effective treatment of the organic waste water as the for-treatment water.

With the forgoing configuration, according to the embodiment, the organic waste water such as waste water from a hog raiser is treated. Hereinafter, the treatment steps will be described with reference to (1) to (3).

(1) Pre-Treatment Step (Third Treatment Step)

To begin with, the pre-treatment step is executed to pre-treat waste water at the pre-treating apparatus 2. In the pre-treatment step, the pumps 9, 10 are operated to store waste water in the pre-treating vessel 6, and the waste water is filtered through the flat film 7 of the filtering means 8.

Accordingly, a solid portion in the organic waste water is captured by the flat film 7, and only waste water whose solid portion has been removed is sent through the pump 10 to the electrolytic treating apparatus 3. Incidentally, the pre-treatment step may be carried out not only at a stage before the electrochemical treatment step (described later in detail) but also between the electrochemical treatment step and the biochemical treatment step.

Additionally, in the pre-treatment step, flocculating agent such as silica iron, ferric chloride or polymer flocculating agent may be added in the pre-treating vessel 6 to flocculate and separate an SS component in the waste water.

(2) Electrochemical Treatment Step (First Treatment Step)

Next, the electrochemical treatment step of the waste water is carried out at the electrolytic treating apparatus 3. In the electrochemical treatment step, the waste water treated in the pre-treatment step is stored in the electrolytic chamber 12 of the electrolytic vessel 13, and power is turned ON by the controller to apply a positive potential to the electrode 14 and a negative potential to the electrode 15. Accordingly, the electrode 14 becomes an anode, and the electrode 15 becomes a cathode.

By the application of the potentials, since each of the electrodes 14, 15 is made of an insoluble conductive material which can generate hypohalogenous acid, ozone, or active oxygen, chloride ion (halide) contained in the waste water emits electrons to generate chlorine (halogen) on the electrode 14 side which constitutes the anode (reaction A). Then, the chlorine (halogen) is dissolved in water to generate hypochlorous acid (hypohalogenous acid) (reaction B). In this case, ozone or active oxygen is simultaneously generated. The reactions A, B are as follows:

$$KCl \rightarrow K^+ + Cl^-$$

$$2Cl^- \rightarrow Cl_2 + 2e^- \quad \text{Reaction A}$$

$$Cl_2 + H_2O \rightarrow HClO + HCl \quad \text{Reaction B}$$

Since the electrodes 14, 15 are made of the insoluble conductive materials, a problem of elution thereof can be prevented by electrolysis, and maintenance workability such as replacement of the electrodes 14, 15 can be simplified. Moreover, because of the constitution of the noble metal electrode or the electrode coated with the noble metal as in the case of the embodiment, hypohalogenous acid or the like can be generated more efficiently in the waste water.

Then, the generated hypochlorous acid (hypohalogenous acid) reacts with ammonia (ammonium ion) contained in the waste water to pass through a plurality of chemical changes, and then converted into nitrogen gas (reaction C). The reaction C is as follows:

$$NH_3+HClO \rightarrow NH_2Cl+H_2O$$

$$NH_2Cl+HClO \rightarrow NHCl_2+H_2O$$

$$NH_2Cl+NHCl_2 \rightarrow N_2\uparrow+3HCl \qquad \text{Reaction C}$$

The ammonia (ammonium ion) in the waste water reacts with ozone or active oxygen generated on the electrode 14 side which constitutes the anode as shown in a reaction D, whereby it is denitrified to nitrogen gas. The reaction D is as follows:

$$2NH_3(aq)+3(O) \rightarrow N_2\uparrow+3H_2O \qquad \text{Reaction D}$$

Meanwhile, by the electrolysis of the waste water, the organic matter contained in the waste water is decomposed into nitrate ion as nitrate nitrogen, ammonia as ammonia nitrogen, ammonium ion, carbon dioxide, water or the like (reaction E). The reaction E is as follows:

$$\text{organic matter} \rightarrow NO_3^- + NH_3 + CO_2 + H_2O \qquad \text{Reaction E}$$

Accordingly, the organic matter in the organic waste water is also converted into nitrate nitrogen or ammonia nitrogen in the electrochemical treatment step.

Figure 2:
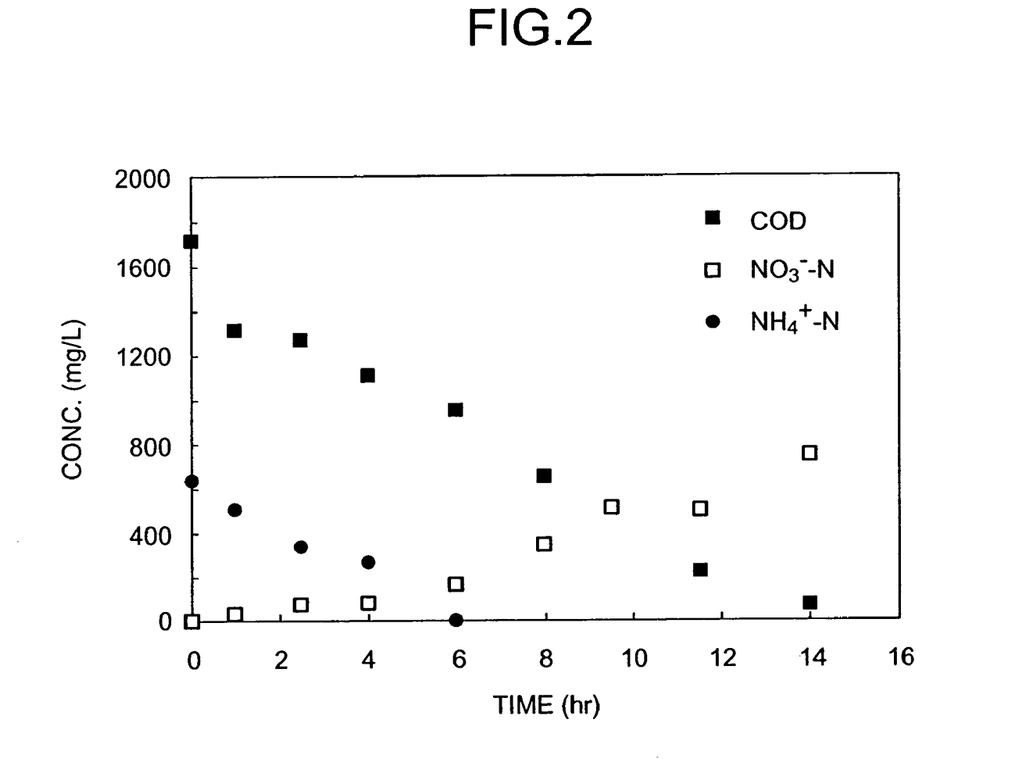
FIG. 2 is a drawing showing concentration change of the nitrate nitrogen processed in an electrochemical processing step, ammonia nitrogen, and COD.

Here, a result of an experiment shown in FIG. 2 shows concentration of COD and nitrate nitrogen and concentration of ammonia nitrogen in the waste water when hog farm's waste water is subjected to electrochemical treatment in the case of using platinum electrodes for the electrodes 14, 15. In the experiment, hog farm's waste water was diluted by ¼, KCl was added by using KCl of 2M to set 100 mM, and 200 ml was used. Defoaming agent may be added in the waste water. The electrodes 14, 15 were arranged at an interval of 3 cm, and electrolysis was carried out at a room temperature. First, 0.5 A was fed between the electrodes 14, 15 for 4 hours to execute constant current electrolysis. Then, 1.0 A was fed between the electrodes 14, 15 to execute constant current electrolysis. According to the embodiment, since similar platinum electrodes were used for the electrodes 14, 15, polarity switching was carried out, e.g., once per 5 sec., in the latter constant current electrolysis.

In FIG. 2, a black square, a white square and a black circle respectively indicate results of measuring concentration of COD, concentration of nitrate nitrogen, and concentration of ammonia nitrogen. It can be understood from the drawing that COD which is first 1750 mg/l by the organic matter contained in the organic waste water becomes below 1000 mg/l 6 hours after the start of electrolysis. Further, by continuing the electrolysis, almost all COD disappears 14 hours after the start of the electrolysis.

On the other hand, it can be understood that the reduction of the organic matter contained in the organic waste water is accompanied by an increase in concentration of nitrate nitrogen initially nonpresent in the waste water with passage of time, and it increases to about over 150 mg/l 6 hours after the start of the electrolysis. Additionally, it can be understood that the concentration reaches about 800 mg/l 14 hours after the start of the electrolysis.

On the other hand, over about 600 mg/l of ammonia nitrogen was contained in the waste water at the start of the electrolysis. However, 6 hours after the start of the electrolysis, almost no ammonia nitrogen is present in the waste water. This is attributed to the fact that the ammonia nitrogen in the waste water is denitrified to nitrogen gas as described above.

According to the experiment, the denitrification of the ammonia nitrogen in the waste water is completed 6 hours after the start of the electrolysis, while a half or more is not completed for the organic matter (COD). Even after the passage of 6 hours, the treatment of the organic matter is accompanied by an increase in the nitrate nitrogen in the waste water, and the denitrification thereof is not completed even after the passage of 14 hours. Accordingly, it can be understood that the denitrification of the ammonia nitrogen is executed easily compared with the treatment of the organic matter and the denitrification of the nitrate nitrogen. Additionally, it can be understood that the treatment of the organic matter and the denitrification of the nitrate nitrogen all by the electrolysis require enormous power and much time, and thus treatment efficiency is low.

Thus, according to the embodiment, the process proceeds to the biochemical treatment step (second treatment step) 7 hours after the start of the electrolysis in the electrochemical treatment step. Incidentally, since the treatment of the ammonia nitrogen in the waste water is completed 6 hours after the start of the electrolysis according to the result of the experiment, the process may proceed to the biochemical treatment step 6 hours after the start of the electrolysis. According to the embodiment, however, the electrochemical treatment step is executed until an optimal concentration ratio is reached between the organic matter and the nitrate nitrogen for denitrification as described later. Thus, the electrochemical treatment step is carried out for 7 hours.

In the aforementioned experiment, no polarity switching is executed for the electrodes 14, 15 for initial 4 hours. In this case, however, polarity switching may be executed for the electrodes 14, 15. Accordingly, formation of an oxidized film such as a scale on the surface of the electrode which constitutes the anode is prevented by the electrochemical technique (electrolysis), whereby passivation of the anode can be prevented.

Figure 4:
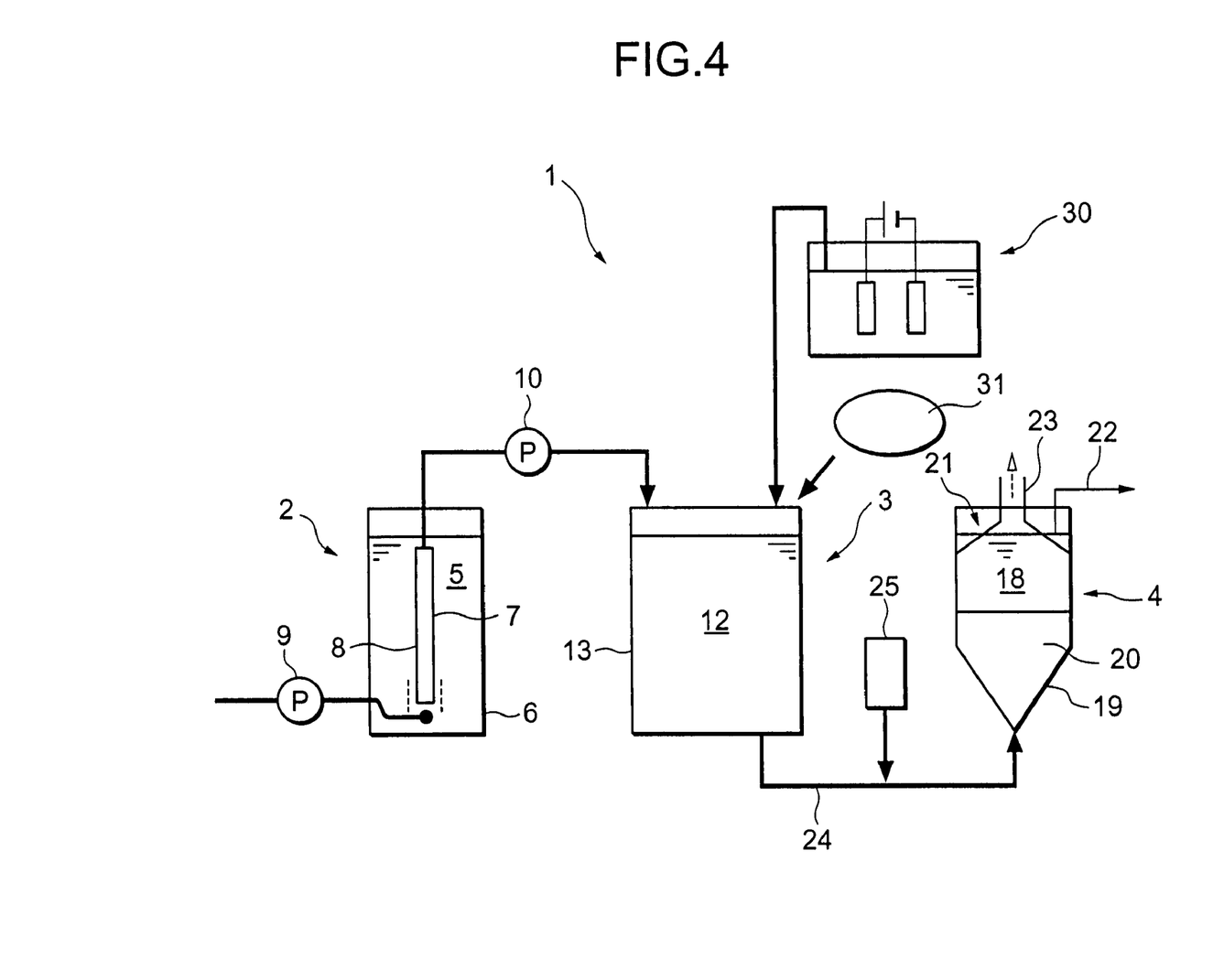
FIG. 4 is the explanatory view showing the outline of a processing system for the treatment of organic waste water in accordance with another example of the present claimed subject matter.
Figure 5:
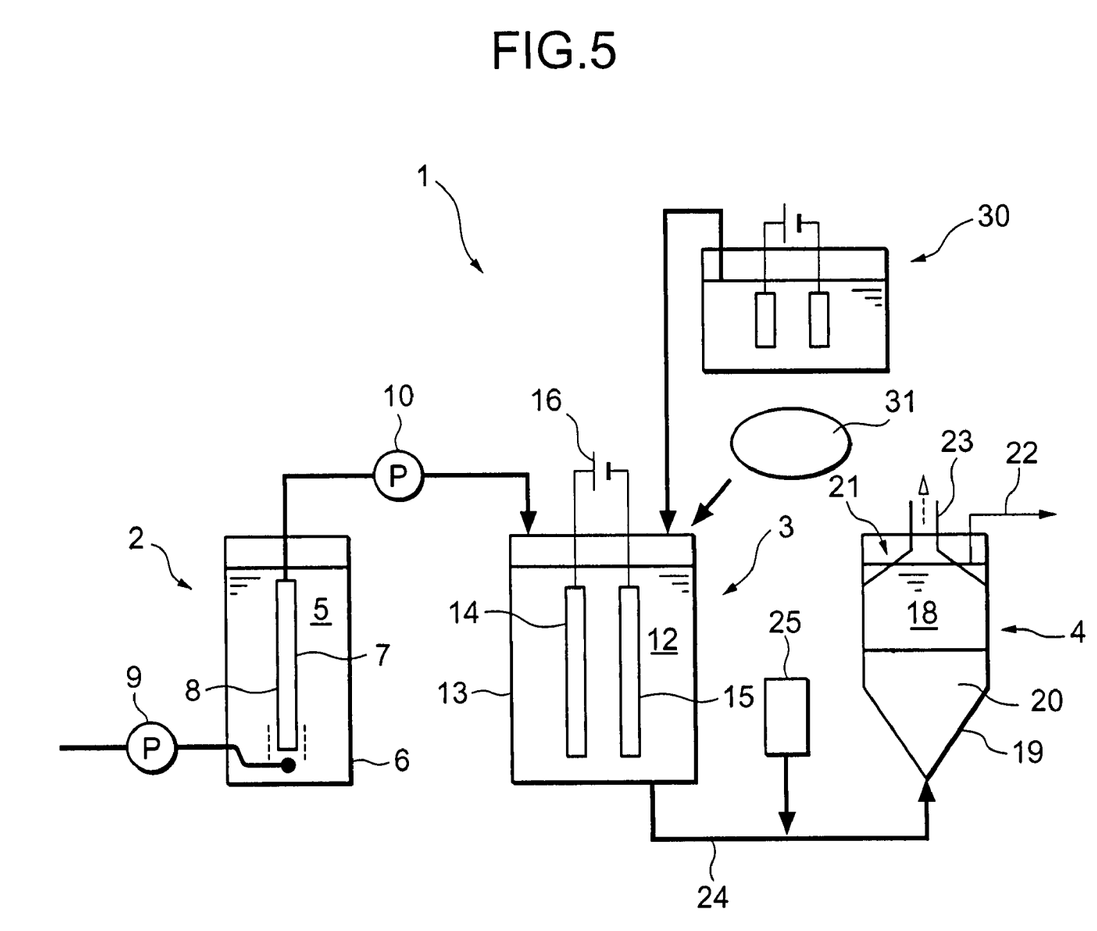
FIG. 5 is the explanatory view showing the outline of a processing system for the treatment of organic waste water in accordance with yet another example of the present claimed subject matter.

In the aforementioned experiment, the waste water stored in the electrolytic chamber 12 is directly subjected to electrolysis by the electrodes 14, 15 to generate hypochlorous acid (hypohalogenous acid), ozone or active oxygen, and the nitrate ion as nitrate nitrogen, or the ammonia or the ammonium ion as ammonia nitrogen in the waste water is treated to nitrogen gas. Other than the above, as shown in FIG. 4, similar effects can be obtained by adding electrolytic water containing hypochlorous acid (hypohalogenous acid), ozone or active oxygen subjected to electrolysis at a separately installed apparatus 30, or hypochlorous acid of a drug 31 to the waste water, and treating the waste water until an optimal concentration ratio is reached between the organic matter and the nitrate nitrogen for denitrification. Additionally, as shown in FIG. 5, the nitrate ion as nitrate nitrogen, or the ammonia or the ammonium ion as ammonia nitrogen in the waste water may be treated to nitrogen gas by adding electrolytic water containing hypochlorous acid (hypohalogenous acid), ozone or active oxygen subjected to electrolysis by the separately installed apparatus 30 or a hypochlorous acid of a drum 31 to the waste water, and directly subjecting the waste water stored in the electrolytic chamber 12 to electrolysis by the electrodes 14, 15. Accordingly, it is possible to carry out waste water treatment with much higher efficiency.

(3) Biochemical Treatment Step (Second Treatment Step)

Next, the biochemical treatment step will be described. The biochemical treatment step is carried out by the biochemical treating apparatus 4. That is, the waste water subjected to the electrochemical treatment step in the electrolytic vessel 13 as described above is fed from the lower part of the denitrification reaction vessel 19 of the biochemical treating apparatus 4 through a pipe 24 into the denitrification reaction chamber 18. The waste water fed into the denitrification reaction chamber 18 contains almost no ammonia nitrogen because the treatment of the ammonia nitrogen has almost been completed as described above.

The waste water fed from the lower part of the denitrification reaction vessel 19 into the denitrification reaction chamber 18 is raised through the granular sludge 20 which has filled the inside in an upward flow. Meanwhile, the nitrate nitrogen and the nitrite nitrogen in the waste water come into contact with the denitrification bacteria to be decomposed to nitrogen gas as detailed above. That is, the denitrification bacteria oxidizes the organic matter by oxygen to obtain energy. However, according to the embodiment, since the anaerobic state is set in the denitrification reaction chamber 18, the denitrification bacteria uses oxygen in nitric acid or nitrous acid to oxidize and decompose the organic matter. Thus, the organic matter, the nitrate nitrogen, and the nitrite nitrogen are denitrified by the denitrification bacteria to be reduced to nitrogen gas (reaction F). The reaction F is as follows. Incidentally, hydrogen in the reaction F is fed from the organic matter in the waste water.

Reaction F $2NO_2^- + 3(H_2) \rightarrow N_2\uparrow + 2H_2O + 2OH^-$ $2NO_3^- + 5(H_2) \rightarrow N_2\uparrow + 4H_2O + 2OH^-$    Reaction F Then, the nitrogen gas or carbon acid gas generated in the denitrification reaction chamber 18 is discharged to the outside through the pipe 23 by the gas-solid liquid separation means 21 disposed in the upper part of the denitrification reaction vessel 19. The waster water denitrified by the denitrification bacterial is taken out through the pipe 22 to the outside by the gas-solid liquid separation means 21. Incidentally, a part of the granular sludge raided together with the nitrogen gas or the carbon acid gas is separated and precipitated by the gas-solid liquid separation means 21.

Incidentally, a technology regarding the aforementioned biochemical treatment by the biochemical treating apparatus 4 has been disclosed in "Optimal Treatment Handbook of Food Factory Waste Water to Deal with 5th Water Quality Total Amount Regulation" issued by Science Forum Co., Ltd., on Apr. 30, 2002.

Next, description will be made of a result of an experiment when the biochemical treatment step is executed after the execution of the electrochemical treatment step as described above with reference to FIG. 3.

(4) Experiment Result of the Embodiment

Figure 3:
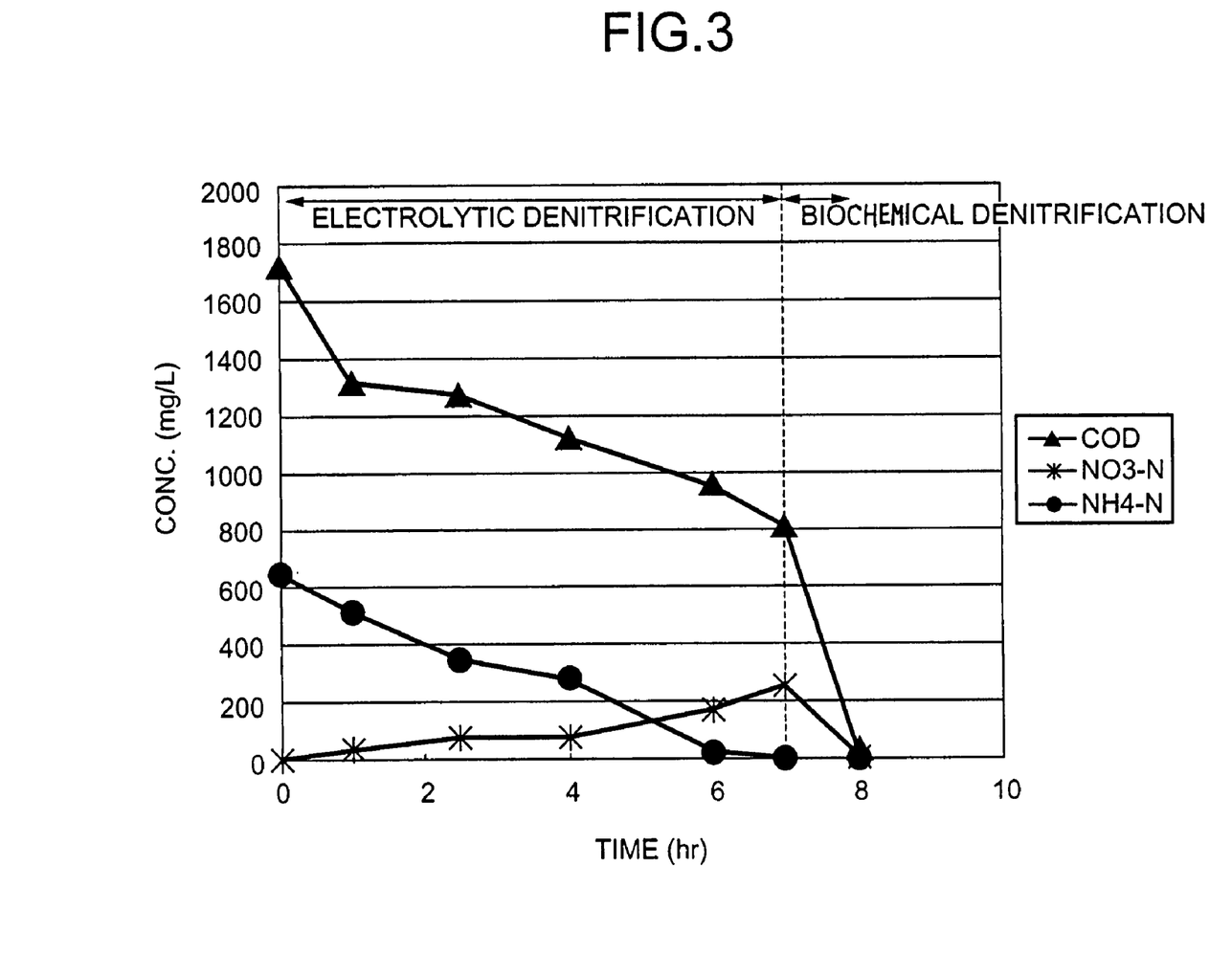
FIG. 3 is a drawing showing concentration change of the nitrate nitrogen processed in an electrochemical processing step and a living thing-processing step, ammonia nitrogen, and COD.

FIG. 3 shows concentration of COD, concentration of nitrate nitrogen, and concentration of ammonia nitrogen when the biochemical treatment step is executed after the electrochemical treatment step is executed for 7 hours under the conditions shown in FIG. 2. In the experiment, the electrochemical treatment step was carried out for 7 hours under the conditions shown in FIG. 2, and then the biochemical treatment step was executed in the denitrification treating vessel 19 for 1 hour.

In FIG. 3, a black triangle, a cross mark and a black circle respectively indicate results of measuring concentration of COD, concentration of nitrate nitrogen, and concentration of ammonia nitrogen. It can be understood from the drawing, in addition to the experiment result, that COD which is first 1750 mg/l is reduced to 800 mg/l 7 hours after the start of electrolysis. Then, in the biochemical treatment step, almost all COD of 800 mg/l disappears after a passage of 1 hour.

On the other hand, it can be understood that the reduction of the organic matter contained in the organic waste water is accompanied by an increase in concentration of nitrate nitrogen initially nonpresent in the waste water with passage of time, and it increases to about 240 mg/l 7 hours after the start of the electrolysis. Then, in the biochemical step, almost all nitrate nitrogen of 240 mg/l disappears after a passage of 1 hour.

Incidentally, in addition to the experiment result, it can be understood that the ammonia nitrogen in the waste water disappears 7 hours after the start of the electrolysis.

From the experiment, it can be understood that the ammonia nitrogen in the waste water disappears 7 hours after the start of the electrolysis and, further, in the biochemical treatment step, denitrification of the organic matter (COD) and the nitrate nitrogen is almost completed after a passage of about 1 hour. Accordingly, it can be understood that the denitrification of the organic matter and the nitrate nitrogen can be easily carried out by biochemically denitrifying the waste water in which the organic matter and the nitrate nitrogen remain in the removed state of the ammonia nitrogen therefrom.

Thus, according to the present invention, in the electrochemical treatment step, the nitrogen compound contained in the organic waste water is reduced. Then, the nitrogen compound contained in the organic waste water can be treated in the biochemical treatment step.

As described above, especially, the ammonia nitrogen contained in the organic waste water can be efficiently denitrified in the electrochemical treatment step. Then, in the biochemical treatment step, the nitrate nitrogen in the organic waste water can be reduced to nitrogen gas.

Accordingly, an efficient reaction can be carried out from the ammonia nitrogen to nitrogen in the electrochemical treatment step. An efficient reduction reaction can be carried out from the nitrate nitrogen to nitrogen gas in the biochemical treatment step.

Therefore, by carrying out the reduction reaction from the nitrate nitrogen to the nitrite nitrogen, and the nitrite nitrogen to the ammonia nitrogen, and the denitrification reaction of the hypohalogenous acid or the like whose enormous power consumption has conventionally been a problem in the biochemical treatment step after the electrochemical treatment step, it is possible to reduce the amount of power consumption and running costs.

Moreover, in the biochemical treatment, the oxidation reaction of low efficiency from the organic nitrogen and the ammonia nitrogen to the nitrate nitrogen is carried out in the electrochemical treatment step before the biochemical treatment step, whereby it is not necessary to dispose an especially large reaction vessel. Thus, the invention can be achieved by a relatively compact apparatus.

Especially, according to the embodiment, since the biochemical treatment step uses the denitrification bacteria (microbe) to reduce the nitrate nitrogen or the nitrite nitrogen in the organic waste water to nitrogen gas at least under the anaerobic conditions, the denitrification bacteria can cause an oxidation decomposition reaction of the organic matter by using oxygen in nitrous acid or nitric acid under the conditions of no dissolved oxygen. Accordingly, it is possible to efficiently reduce the nitrate nitrogen or the nitrite nitrogen in the organic waste water to nitrogen gas. Further, even the organic matter in the organic waste water can be decomposed to enable more effective treatment of the organic waste water.

Moreover, by using the granular sludge in the biochemical treatment step, it is possible to more effectively treat the nitrate nitrogen or the nitrite nitrogen, and the organic matter in the organic waste water.

In the biochemical treatment step, in the case of denitrifying the nitrate nitrogen by using a hydrogen donor of an unclear composition such as a BOD component in the waste water, and the denitrification bacteria, a BOD component necessary for reducing nitrate nitrogen of 1 mg/l is 2.86 mg/l as theoretical BOD if oxidation is complete. This technology has been disclosed in "Antipollution Technology and Regulations: Water Quality" 4th edition issued by Japan Environmental Management Association on Apr. 30, 1998.

Therefore, in order to greatly reduce the amount of a residual organic matter without leaving nitrate nitrogen in the waste water, preferably, an organic matter of concentration larger by 2.8 or more than that of nitrate nitrogen in the waste water at the stage of transfer to the biochemical treatment step, especially in a range of 2.8 to 3.5 times larger, is present therein (in this case, a sample in which a COD value is roughly equal to a BOD value is used). In such a case, an amount of an organic matter necessary for treatment of the nitrate nitrogen in the organic waste water can be secured to enable effective treatment of the nitrate nitrogen therein. Additionally, without presence of an organic matter more than necessary with respect to the treatment amount of the nitrate nitrogen in the organic waste water, it is possible to prevent a problem that a large amount of an organic matter will remain after the treatment.

Accordingly, if the concentration of the organic matter in the waste water before the execution of the biochemical treatment step is outside the aforementioned range, adjustment of the concentration of the organic matter in the waste water or special treatment of the treated waste water is preferably carried out as in the cases of (5) to (7) below.

(5) Concentration of the Organic Mater in the Waste Water before the Execution of the Biochemical Treatment Step is Larger by 2.8 or Less than that of Nitrate Nitrogen (First Example).

In this case, preferably, an organic matter such as methanol is added into the denitrification reaction chamber 18 before the execution of the biochemical treatment step to adjust the concentration of the organic matter in the above range, i.e., larger by 2.8 or more than the concentration of nitrate nitrogen, especially, in the range of 2.8 to 3.5 times larger.

(6) Concentration of the Organic Matter in the Waste Water before the Execution of the Biochemical Treatment Step is Larger by 2.8 or Less than that of Nitrate Nitrogen (Second Example).

In this case, the electrochemical treatment step before the biochemical treatment step is executed until the concentration of the organic matter is set in the above range, i.e., larger by 2.8 or more than that of the nitrate nitrogen, especially in the range of 2.8 to 3.5 times larger. Then, the biochemical treatment step is executed.

(7) Concentration of the Organic Matter in the Waste Water before the Execution of the Biochemical Treatment Step is Larger by 3.5 or More than that of Nitrate Nitrogen.

In this case, almost all the nitrate nitrogen in the waste water can be treated by executing the biochemical treatment step. However, because of presence of the organic matter more than necessary for treatment of the nitrate nitrogen in the waste water, the excessive organic matter remains therein. Thus, in order to treat the residual organic matter, preferably, the COD.BOD treatment is executed after the biochemical treatment step to reduce COD or BOD of the organic matter.

Additionally, if the organic matter (BOD) of the waste water is present more than necessary for treatment of the nitrate nitrogen therein, treatment may be executed to reduce the organic matter by adding an amount of nitrate salt necessary for treating the excessive organic matter (BOD) in the waste water. In such a case, for example, by detecting a specific gravity of gas generated from the waste water, i.e., a specific gravity calculated based on a ratio of generated nitrogen gas, nitrous oxide or the like, concentration of nitrous oxide, or an oxidation reduction potential or pH of the waste water, treatment states of the organic matter (BOD) and the nitrate nitrogen in the waste water are determined to decide an amount of nitrate salt to be added. Incidentally, the concentration of the organic matter in the waste water is not limited to 3.5 or more than that of the nitrate nitrogen.

According to the embodiment, in addition to the foregoing, the pre-treatment step is carried out to filter the organic waste water at the stage before the electrochemical treatment step as detailed above. Thus, a solid portion can be removed from the organic waste water in the pre-treatment step to increase reaction efficiency of the chemical and biochemical treatment steps thereafter.

According to the embodiment, as shown in FIG. 1, before the biochemical treatment step after the completion of the electrochemical treatment step, the available chlorine removing means 25 is disposed to add reduction agent such as sodium thiosulfate into the waste water. Accordingly, in the electrochemical treatment step, an available chlorine component such as hypochlorous acid generated in the waste water can be efficiently removed before the execution of the biochemical treatment step. It is possible to prevent a problem that the oxidation agent such as hypochlorous acid will adversely affect the denitrification bacteria which causes a denitrification reaction.

According to the embodiment, the available chlorine removing means 25 is specially disposed. However, since the oxidation agent such as hypochlorous acid only needs to disappear from the waste water treated in the electrochemical treatment step before the start of the biochemical treatment step. Thus, a vessel for keeping the waste water for relatively long may be disposed to remove the hypochlorous acid or the like after the electrochemical treatment step and before the biochemical treatment step.

Additionally, the VIII group of the periodic table or the conductive material containing the VIII group, alternatively the conductive material coated with the same group or the conductive material containing the same group may be used as one of the electrodes 14, 15 which constitutes the cathode used in the electrochemical treatment step of the embodiment. In such a case, in the electrochemical treatment step, the nitrate nitrogen can be reduced to ammonia to be denitrified and, at the same time, the polarity is switched to dissolve the anode, whereby phosphorus contained in the for-treatment water can be precipitated and removed.

According to the embodiment, the organic waste water has been cited as the for-treatment water containing the organic matter and the nitrogen compound as described above. In addition, however, even water from a rivet or a pond can provide similar effects as long as it is for-treatment water which contains an organic matter and a nitrogen compound.

What is claimed is:

1. A method for treating water containing an organic matter and a nitrogen compound, comprising:
   a first treatment step of immersing at least a pair of electrodes at least partially in the water to treat the same by an electrochemical technique; and
   a second treatment step of biochemically treating the water after completion of the first treatment step,
   wherein the second treatment step uses a microbe to reduce nitrate nitrogen or nitrite nitrogen in the water to nitrogen gas at least under anoxic conditions.

2. A method for treating water containing organic matter and a nitrogen compound, comprising:
- a first treatment step of adding electrolytic water in which hypohalogenous acid, ozone or active oxygen is generated by an electrochemical technique, or adding a hypohalogenous acid of a drug to the water; and
- a second treatment step of biochemically treating the water after completion of the first treatment step.

3. A method for treating water containing organic matter and a nitrogen compound, comprising:
- a first treatment step of adding electrolytic water in which hypohalogenous acid, ozone or active oxygen is generated by an electrochemical technique, or adding a hypohalogenous acid of a drug to the water, and immersing at least a pair of electrodes at least partially in the water to treat the same by an electrochemical technique; and
- a second treatment step of biochemically treating the water after completion of the first treatment step.

4. The method according to one of claims 2 to 3, wherein the second treatment step uses a microbe to reduce nitrate nitrogen or nitrite nitrogen in the water to nitrogen gas at least under anoxic conditions.

5. The method according to one of claims 1 to 3, wherein the second treatment step uses granular sludge.

6. The method according to claim 4, wherein the second treatment step uses a microbe carried by a carrier.

7. The method according to one of claims 1 to 3, wherein BOD concentration of the organic matter in the water treated in the second treatment step is set larger by 2.8 or more than concentration of the nitrate nitrogen therein.

8. The method according to one of claims 1 to 3, wherein after completion of the second treatment step, a COD.BOD treatment step is carried out to reduce COD and BOD of a residual organic matter in the water.

9. The method according to one of claims 1 to 3, wherein each electrode used in the first treatment step is an insoluble conductive material capable of generating hypohalogenous acid, ozone or active oxygen.

10. The method according to claim 9, wherein a noble metal or a conductive material coated with a noble metal is used as one of the electrodes which constitutes at least an anode.

11. The method according to claim 10, wherein the conductive material coated with the noble metal is coated by plating of the noble metal.

12. The method according to claim 11, wherein a VIII group of a periodic table or a conductive material containing a VIII group, alternatively a conductive material coated with the same group or a conductive material containing the same group is used as one of the electrodes which constitutes a cathode.

13. The method according to one of claims 1 to 3, wherein in the first treatment step a polarity of each of the electrodes is switched to treat the nitrogen compound in the water by an electrochemical technique.

14. The method according to one of claims 1 to 3, wherein before execution of the second treatment step after execution of the first treatment step, an available chlorine removal treatment step is carried out to remove an available chlorine component from the water.

15. The method according to one of claims 1 to 3, wherein a third treatment step is carried out to filter the water at a stage before the first treatment stage, or between the first treatment step and the second treatment step.

16. The method according to one of claims 1 to 3, wherein the water is organic waste water.

* * * * *